United States Patent [19]
Paugh

[11] 3,860,452
[45] Jan. 14, 1975

[54] METHOD OF DISSOLVING GRANULATED MATERIAL

[75] Inventor: George W. Paugh, Saint Louis, Mo.

[73] Assignee: Ralston Purina Company, St. Louis, Mo.

[22] Filed: Aug. 1, 1973

[21] Appl. No.: 384,669

Related U.S. Application Data

[63] Continuation-in-part of Ser. No. 222,749, Feb. 2, 1972, abandoned.

[30] Foreign Application Priority Data
Dec. 6, 1972 Canada .................................. 158206

[52] U.S. Cl. ...................... 127/63, 127/22, 127/29, 241/21, 241/27, 423/208, 423/499
[51] Int. Cl. ............................. B01f 1/00, C13f 1/14
[58] Field of Search ............... 127/22, 63; 23/267 R, 23/312 AH; 241/21, 23, 27; 423/208, 499

[56] References Cited
UNITED STATES PATENTS

| | | | |
|---|---|---|---|
| 692,020 | 2/1902 | Lambert | 127/63 |
| 2,206,237 | 7/1940 | Roberts | 127/22 |
| 2,395,258 | 2/1946 | Drake | 23/272 |
| 2,412,106 | 12/1946 | Swartz | 423/499 |
| 2,626,728 | 1/1953 | Harper | 23/267 R |
| 2,641,537 | 6/1953 | Dunn | 423/499 |
| 2,796,365 | 6/1957 | Thurlings | 127/63 X |
| 2,929,747 | 3/1960 | Lippman | 127/63 |
| 3,168,379 | 2/1965 | Miller | 423/208 |
| 3,331,560 | 7/1967 | Hodgson | 241/21 X |
| 3,363,995 | 1/1968 | Driskell | 423/499 X |
| 3,365,280 | 1/1968 | Heiss | 423/208 |
| 3,385,674 | 5/1968 | Kolasinski | 423/208 |
| 3,428,487 | 2/1969 | Allen | 127/63 X |
| 3,436,025 | 4/1969 | Sheldon | 241/27 X |
| 3,623,848 | 11/1971 | Fisher | 423/499 |
| 3,692,579 | 9/1972 | Lauer | 127/63 X |
| 3,711,254 | 1/1973 | McGowan | 423/499 |
| 3,800,026 | 3/1974 | Morgan | 423/499 X |

FOREIGN PATENTS OR APPLICATIONS

| | | |
|---|---|---|
| 498,406 | 12/1953 | Canada |
| 685,160 | 4/1964 | Canada |

OTHER PUBLICATIONS
Chemical Abstracts, 63: 14425 d (1965).

*Primary Examiner*—Morris O. Wolk
*Assistant Examiner*—Sidney Marantz
*Attorney, Agent, or Firm*—Veo Peoples, Jr.; Lawrence J. Hurst

[57] ABSTRACT

A method for continuously forming a solution having a desired concentration of a dissolvable granular or crystalline metal therein. More particularly a method for continuously forming a liquid sugar having a desired brix from granulated sugar or a desired brine solution from rock salt. This is accomplished by forming a uniform suspension of the granulated material in water, continuously advancing the suspension to a grinder and thereafter grinding the suspension to substantially instantly dissolve the granular material and form the desired liquid product.

20 Claims, 1 Drawing Figure

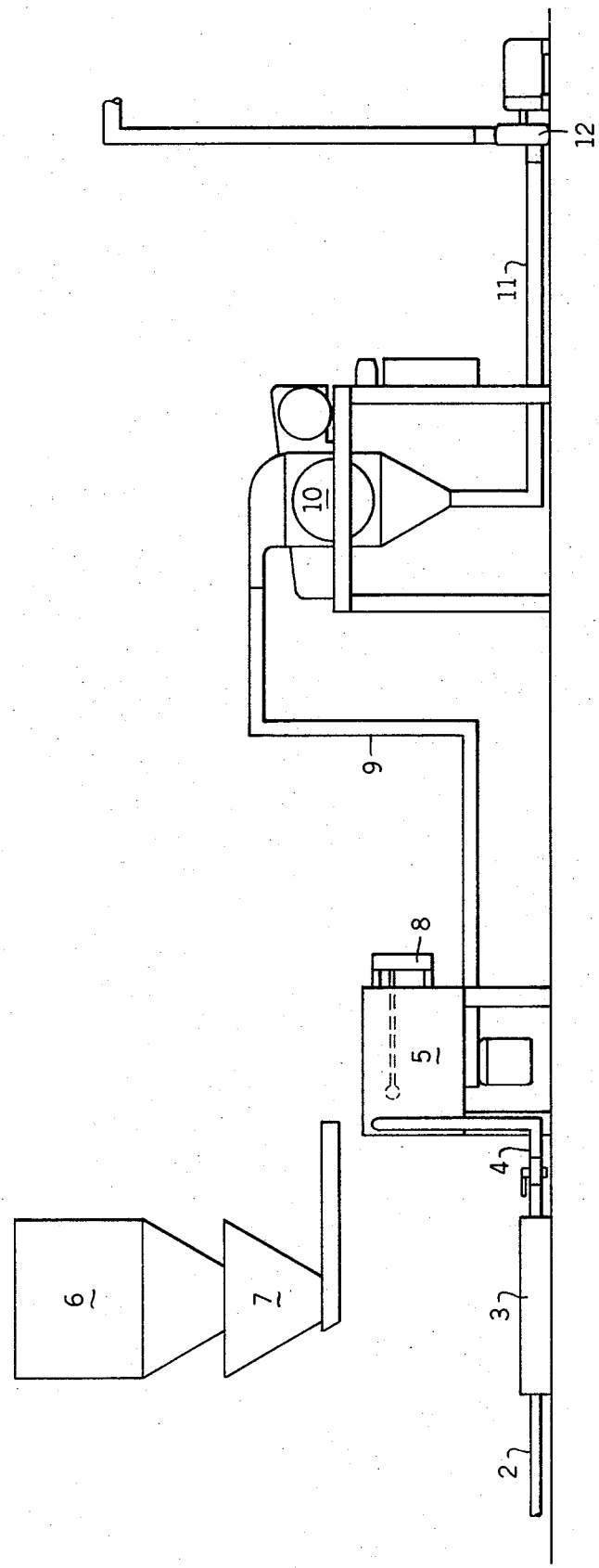

METHOD OF DISSOLVING GRANULATED MATERIAL

This application is a continuation-in-part application of my copending application Ser. No. 222,749, entitled "LIQUID SUGAR PROCESS" filed February 2, 1972, now abandoned.

BACKGROUND OF THE INVENTION

In the past various means of forming solutions from crystalline or granular material have been utilized. However, these methods have not been particularly satisfactory for continuous, high volume applications. Specifically, the present invention is directed to the formation of a desired brix solution from granulated sugar or the formation of a desired brine solution from rock salt.

The prior art has generally disclosed methods of adding granulated sugar to hot water for converting the granulated sugar into a liquid sugar product having a desired brix or concentration. Normally, such systems merely relied upon a continuous agitation of the sugar and hot water until the sugar was completely dissolved. In utilizing these types of systems it was normally necessary that the liquification process be carried out in a batch manner due to the extreme length of time required for completely dissolving the sugar. Also, when preparing a large quantity of liquid sugar, it is necessary to use equipment which is expensive and which is capable of pumping or agitating the mixture as the sugar is dissolved. One of the typical systems presently being utilized for forming liquid sugar from a railroad car of granulated sugar, requires that hot water be pumped into the railroad car and the suspension formed be continuously pumped and circulated until the desired liquid sugar product is obtained. This has the undesirable or disadvantageous features of requiring an extremely large heat supply to maintain the quantity of water required at the desired temperature and also requires a pump for moving or circulating the water and sugar mixture for a considerable period of time to obtain the desired liquid sugar product.

Due to the increased utilization of liquid sugar, and particularly liquified sugar having a concentration or brix of 65 – 75 percent, it has been found desirable to economically, liquify granulated sugar at high rates of speed on a continuous basis.

The prior art method of making a brine solution from rock salt consisted generally of using a cylindrical tank into which dry rock salt is fed to completely fill the cylindrical tank. Water is then supplied to the upper portion of the cylindrical tank and as the water flows downward through the salt, it dissolves the salt and becomes saturated brine. The formed brine solution is then removed from the lower portion of the cylindrical tank.

Accordingly, it is the object of this invention to provide a method for continuously forming a liquid solution from a granular or crystalline material. More specifically, it is the object of this invention to provide a method for continuously forming liquid sugar from fine or extra fine granulated sugar and forming a brine solution from rock salt.

SUMMARY OF THE INVENTION

Basically, the present invention comprises a method for continuously forming a liquid solution having a desired concentration from a dissolvable granular or crystalline material by metering the granular material and liquid in predetermined ratios to continuously form a substantially uniform suspension of the granular material and liquid, advancing successive portions of the suspension to a grinder, and thereafter subjecting the suspension to sufficient grinding action to substantially instantly dissolve the granular material and form the liquid product.

More particularly, the present invention is directed to a method of continuously forming liquid sugar having a desired brix from granular sugar by metering granulated sugar and water together in predetermined ratios to continuously form a substantially uniform suspension of granular sugar in water, advancing succesive portions of the suspension to a grinder, and thereafter subjecting the suspension to sufficient grinding action to instantly dissolve the sugar and form the desired liquid sugar product.

DESCRIPTION OF THE DRAWING

The drawing is an illustration of one embodiment or arrangement of equipment capable of continuously forming a liquid product from a granular material and specifically a liquid sugar from granulated sugar.

DESCRIPTION OF THE PREFERRED EMBODIMENT

As used herein, the term granular or crystalline material is intended to cover a material which is dissolvable in the liquid to which it is added such that a solution of desired concentration of the dissolvable material may be formed. Since the present invention is principally directed to the formation of a liquid sugar product the preferred embodiment of the invention will be described in terms of producing a liquid sugar product, although it should be understood that other liquids and dissolvable granular or crystalline material may be utilized in practicing the present invention.

Referring now to the drawing, the liquid, normally water, to be utilized in the system is supplied through the pipe 2 from a source not shown and passed through the heat exchanger 3, wherein the water is heated to improve the ability of the sugar to be formed into the desired suspension. For other solutions and materials it may not be necessary to heat the liquid. Water temperatures from 32° – 212° F. may be utilized, however, preferably the water will be heated to a temperature in the range of 150° – 190° F. for preparing a liquid sugar product. For preparing a brine solution from rock salt, it was found that the heating of the water was not necessary and desirable results may be obtained with water at a temperature of 40° – 70° F. and more particularly at 55° F. The water then passes through the conduit 4 to the tank of a liquifier 5, or other suitable means provided with stirring or agitating capabilities. The liquifier 5 is of the type commercially available from suppliers such as Lanco Inc., and generally consists of a tank having stirring means therein driven by a motor for agitating or blending the material supplied thereto and discharge means are provided in the tank to permit the continuous removal of the blended material.

The sugar utilized for the present invention may be of any desired size such as fine granulated, extra fine granulated or baker's special granulated which are the most desirable from an economic viewpoint. However, if desired, other granular sizes of sugar would work equally well. Since extra fine granulated sugar is presently the most economical available, it is the preferred form of sugar to be utilized in the present system. The salt utilized may be of any granular or crystalline form but preferably will be the commercially available, rock salt due to economic considerations. The granulated sugar is supplied from the storage bin 6 through the control and feed metering device 7 to the liquifier 5. The rate of continuously supplying the granulated sugar and water is controlled such that the concentration of sugar added to the water supplied to the liquifier 5 is in a predetermined and controlled ratio to obtain the desired concentration or brix of the final product. Depending on the soluble material being dissolved to form a solution, the concentrations of material being supplied to the liquifier may be adjusted. The sugar can be supplied in an amount to form a brix from almost 0 to about 83 percent and typically the sugar will be 65 – 75 percent by weight of the suspension formed in the liquifier. As is well known in the art, the control of the granular sugar and the supply of the water may be calibrated to obtain the desired ratios or quantities of these materials being supplied to the liquifier 5 in order to maintain the concentration within the desired limits. For the brine solution formed from rock salt, the rock salt will be supplied to form a brine solution from almost 0 to about 27 percent and typically the brine solution will be about 20 – 25 percent. A level indicator and valve control mechanism 8 is provided on the liquifier 5 for controlling the retention of the sugar and water in the liquifier, such that the sugar and water are maintained therein for a predetermined period of time which insures the substantial suspension of the granulated sugar in the water. The mechanism 8 is effective to control the flow of suspension from the liquifier 5 to the grinder 10 and by controlling the flow to the grinder, the mechanism regulates the retention of the material in the liquifier. The liquifier 5 agitates or blends the ingredients into a smooth suspension. Typically the sugar and water will be maintained in the liquifier 5 for a brief period of time sufficient to obtain the desired smooth suspension, and desirably the retention will be only for a few seconds, typically approximately 20 – 40 seconds under agitation to obtain the desired smooth suspension. Thereafter, successive portions of the suspension are continuously advanced or pumped by the liquifier 5 through the conduit 9 to a grinder 10, such as a Fitzmill hammer mill, which equipment is well known to those skilled in the art and commercially available.

The grinder is provided with blunt hammers for mechanically working or grinding the suspension and is also provided with a screen opening through which the suspension must pass to be discharged therefrom. The grinding is carried out for a period of time or to a sufficient degree to substantially instantly dissolve the sugar or put the sugar into suspension in such small particles that it remains in suspension until it is substantially instantly dissolved to form the desired liquid sugar product. Preferably, this would be achieved by grinding to a sufficient degree that the slurry will pass through a screen having openings of approximately 0.012 inches or smaller. The liquid sugar as it exits from the grinder through the conduit 11 has the desired brix or sugar concentration and may thereafter be stored for subsequent use or pumped by pump 12 to a tank for immediate use. Care should be exercised during the grinding operation to prevent the temperature of the suspension from exceeding approximately 210° F., since temperatures above this may produce a darkening or browning of the liquid sugar which may not be desired. Also, if desired, a holding tank may be placed between the grinder 10 and pump 12 to permit the removal of air from the liquid sugar product prior to the pumping thereof.

By utilizing the process as described, it is possible to operate the system at very high production rates and in a continuous manner with production rates of approximately 60,000 pounds per hour of liquid sugar having a brix of 67 percent being readily and easily achieved. Although it is also possible to form the desired liquid sugar product by initially grinding the sugar to a very fine particle size and thereafter dissolve the finely ground sugar in heated water, this is not as effective as first forming a suspension and then grinding, as previously described. This is due to the generation of heat which occurs during the grinding of the sugar in a dry state. It is necessary to use a greatly reduced flow rate of dry sugar through the grinder to prevent the heating from causing the sugar to become sticky and bind up. Normally the volume of sugar which may be processed in a given period of time by utilizing the initial dry grinding of the sugar, is about 10 percent of the volume of sugar which may be handled by the process wherein the sugar is initially formed into a suspension and then ground.

When preparing a brine solution from rock salt, it has been found that the liquifying and grinding steps utilized for processing sugar is substantially the same, however, an increase of horsepower is required to achieve the desired grinding of the rock salt and to pass through the 0.012 inch opening in the screen as compared with the horsepower requirement for processing a comparable quantity of liquid sugar.

From the foregoing, it is now apparent that a continuous method of forming a liquid product or solution from a crystalline material dissolvable in a liquid and particularly a liquid sugar product from granulated sugar has been disclosed meeting the objects and advantages previously set forth and that changes or modifications may be made in the process set forth by way of example without departing from the spirit of the invention defined by the claims which follow.

I claim:

1. A method for continuously forming a liquid product from a dissolvable granular material and a liquid comprising the steps of: forming a mixture of the granulated material and water in a predetermined ratio, agitating the mixture to get a substantially uniform suspension of the granular material in the liquid, advancing successive portions of the substantially uniform suspension to a grinder and continuously grinding the suspension sufficiently to substantially instantly dissolve the granular material to form the liquid product.

2. The method according to claim 1 wherein the grinding of the suspension is sufficient that it will be discharged through a screen having openings no larger than approximately 0.012 inches.

3. A method for continuously forming a liquid sugar product from granulated sugar comprising the steps of: forming a mixture of granulated sugar and water in a predetermined ratio wherein the sugar is present in an amount for the final product to have a brix up to about 83 percent, agitating the mixture to get a substantially uniform suspension of the sugar in the water, advancing successive portions of the substantially uniform suspension to a grinder and continuously grinding the suspension sufficiently to substantially instantly dissolve the sugar and form the liquid sugar product.

4. The method according to claim 3 wherein the water is heated 150° – 190° F. prior to mixing with the granulated sugar.

5. The method according to claim 3 wherein the sugar is present in the liquid sugar product in an amount of 65 – 75 percent by weight.

6. The method according to claim 3 wherein the grinding is sufficient to allow the suspension to pass through a screen having openings no larger than approximately 0.012 inches.

7. The method according to claim 3 wherein the mixture is formed by continuously metering a predetermined ratio of sugar and water into a liquifier, and the uniform suspension is continuously metered from the liquifier following the agitation for a brief period of time.

8. The method according to claim 7 wherein the mixture is agitated for a period of time of about 20 – 40 seconds.

9. The method according to claim 8 wherein the uniform suspension is sufficiently ground to pass through a screen having openings no larger than approximately 0.012 inches.

10. The method according to claim 9 wherein the water is heated to a temperature of approximately 150°– 190° F. prior to mixing with the granulated sugar.

11. The method according to claim 10 wherein the sugar is present in the liquid sugar product in an amount of 65 – 75 percent by weight.

12. A method for continuously forming a liquid brine product from rock salt comprising the steps of: forming a mixture of rock salt and water in a predetermined ratio wherein the salt is present in an amount for the final product to have a salt concentration up to about 27 percent by weight, agitating the mixture to get a substantially uniform suspension of the salt in the water, advancing successive portions of the substantially uniform suspension to a grinder and continuously grinding the suspension to substantially instantly dissolve the salt and form the liquid brine product.

13. The method according to claim 12 wherein the water is at a temperature of about 40° – 70° F. prior to mixing with the rock salt.

14. The method according to claim 12 wherein the salt is present in the liquid brine product in an amount of about 20 – 25 percent by weight.

15. The method according to claim 14 wherein the grinding is sufficient to allow the suspension to pass through a screen having openings no larger than approximately 0.012 inches.

16. The method according to claim 12 wherein the mixture is formed by continuously metering a predetermined ratio of rock salt and water into a liquifier, and following the agitation of the mixture of salt and water for a brief period of time, the uniform suspension is continuously metered from the liquifier.

17. The method according to claim 16 wherein the mixture is agitated for a period of time of about 20 – 40 seconds.

18. The method according to claim 16 wherein the uniform suspension is sufficiently ground to pass through a screen having openings no larger than approximately 0.012 inches.

19. The method according to claim 18 wherein the water is at a temperature of approximately 40° – 70° F. prior to mixing with the rock salt.

20. The method according to claim 18 wherein the salt is present in the liquid brine product in an amount of about 20 – 25 percent by weight.

* * * * *

UNITED STATES PATENT OFFICE
CERTIFICATE OF CORRECTION

Patent No. 3,860,452          Dated  Jan. 14, 1975

Inventor(s) George W. Paugh

It is certified that error appears in the above-identified patent and that said Letters Patent are hereby corrected as shown below:

In the Abstract, line 3, the word "metal" should read "material"

Column 2, line 15, the word "succesive" should read "successive"

Column 3, line 21, the word "granular" should read "granulated"

Signed and sealed this 8th day of April 1975.

(SEAL)
Attest:

RUTH C. MASON
Attesting Officer

C. MARSHALL DANN
Commissioner of Patents
and Trademarks